UNITED STATES PATENT OFFICE.

ARMAND HENRI ALEXANDRE, OF LEVALLOIS-PERRET, FRANCE, ASSIGNOR TO SOCIETE E. H. MOLL & CIE, OF PARIS, FRANCE.

PROCESS OF SOLDERING ALUMINUM.

1,301,633.

Specification of Letters Patent.   Patented Apr. 22, 1919.

No Drawing.   Application filed November 2, 1917.   Serial No. 199,912.

*To all whom it may concern:*

Be it known that I, ARMAND HENRI ALEXANDRE, a citizen of the French Republic, residing at 114 Rue-Victor-Hugo a', Levallois-Perret, Seine, in the country of France, have invented certain new and useful Improvements in Processes of Soldering Aluminum, of which the following is a specification.

This invention relates to a process of soldering whereby there is obtained a joint of very high resistance so that pieces of aluminium soldered or brazed by the process exhibit great resistance both to bending and drawing, and may be hammered and worked without rupture of the joint.

The solder for use in this invention may be prepared as follows:—

There are melted together in a crucible of suitable capacity, 55 parts of tin and 45 parts of zinc. When fusion is complete there are added 2.5 grams of stearin per 100 grams of the tin-zinc solder, which facilitates the separation of impurities, which come to the surface and are removed by skimming. The stearin eventually evaporates.

The fused mixture is heated to a suitable temperature and stirred so as to make it as homogeneous as possible. When this condition has been attained the molten mass is cast into the form of sticks of suitable size in respect of cross section and length.

The proportion of zinc to tin in the mixture may be modified, accordingly as it is desired to make a solder more or less soft. For example, the proportion of zinc may be increased and that of tin decreased until there are equal weights of zinc and tin.

A still more malleable solder and one substantially unaltered by moisture may be made by adding to the mixture of 55 parts of tin and 45 parts of zinc the following materials:—

20 parts of tin, 1.65 parts of fine silver and 1.35 parts of yellow brass. In this case the composition of the modified solder may be, for example, as follows in parts per thousand—

609.756 tin,
365.853 zinc,
13.414 fine silver,
10.975 yellow brass.

To prepare such a mixture in a satisfactory manner the procedure may be as follows:—

There are melted together in a crucible of suitable capacity, 100 grams of tin, 13.414 grams of fine silver and 10.975 grams of yellow brass. When the whole is fused and perfectly homogeneous, the rest of the tin and the zinc are added, namely 509.756 grams of tin and 365.853 grams of zinc.

The proportion of stearin remains the same, namely 2.5 grams per 100 grams of the above composition and the rest of the operation is similar to that previously described.

As in the first case, the proportions indicated may be modified to a certain degree, accordingly as it is desired to obtain a more or less soft solder.

In using such solders the aluminium parts which are to be soldered or brazed together are first cleaned with a file or emery paper, then heated by means of a blow-lamp and, when at the right temperature, rubbed at the requisite portion of the heated part with a stick of solder, the fusion of which produces a sort of tinning which may be spread by means of a stick of brass.

The two parts to be soldered having been thus tinned are applied to each other and are strongly heated to provoke thorough soldering.

The work is now allowed to cool. Soldering performed in this manner allows of any subsequent manipulation without fear of rupture.

The same solder may be used for soldering aluminium to other metals, such as copper, silver and gold, but these metals should be first tinned by ordinary processes, which consist in spreading the tin with aid of hydrochloric acid on the parts to be soldered.

Having thus fully described the nature of my invention and the best means I know for carrying the same into practical effect; I claim:—

1. The process of making solder for use with aluminum, which consists in melting together about two parts of tin, and one part of zinc, with a small percentage each of fine silver and of yellow brass, and with a small amount of fatty matter, stirring the molten alloy to separate impurities and evaporate the fatty matter, and skimming off the impurities.

2. A solder for use with aluminum, consisting of approximately 61 per cent. tin, 36 per cent. zinc, and one to two per cent. each of silver and brass.

In witness whereof I have hereunto signed my name in the presence of two subscribing witnesses.

ARMAND HENRI ALEXANDRE.

Witnesses:
    CHAS. P. PRESSLY,
    HENRI CARTIER.